US006578006B1

(12) United States Patent
Saito et al.

(10) Patent No.: US 6,578,006 B1
(45) Date of Patent: Jun. 10, 2003

(54) PROJECT WORK MANAGEMENT METHOD AND SYSTEM

(75) Inventors: Takashi Saito, Kobe (JP); Hiroshi Majima, Yokohama (JP); Ryoichi Shibuya, Yokohama (JP); Hiroshi Tsuji, Itami (JP); Yoshiaki Hattori, Aichi-ken (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/291,945

(22) Filed: Apr. 15, 1999

(30) Foreign Application Priority Data

Apr. 16, 1998 (JP) .......................................... 10-122971

(51) Int. Cl.[7] .............................................. G06F 17/60
(52) U.S. Cl. .................................... 705/9; 705/7; 705/8
(58) Field of Search .......................... 705/7–9; 707/10; 710/200; 714/15

(56) References Cited

U.S. PATENT DOCUMENTS

| | | | | |
|---|---|---|---|---|
| 5,301,320 A | * | 4/1994 | McAtee et al. ................. | 705/9 |
| 5,524,241 A | * | 6/1996 | Ghoneimy et al. ............ | 707/10 |
| 5,581,691 A | * | 12/1996 | Hsu et al. ...................... | 714/15 |
| 5,826,020 A | * | 10/1998 | Randell ......................... | 709/201 |
| 5,832,455 A | * | 11/1998 | Hayashi et al. ................ | 705/7 |
| 5,848,271 A | * | 12/1998 | Caruso et al. ................. | 712/220 |
| 5,999,911 A | * | 12/1999 | Berg et al. ..................... | 705/7 |
| 6,092,048 A | * | 2/2000 | Treatch .......................... | 705/9 |

FOREIGN PATENT DOCUMENTS

| | | |
|---|---|---|
| JP | 7-160636 | 6/1995 |
| JP | 8-101817 | 4/1996 |
| JP | 8-221486 | 8/1996 |

OTHER PUBLICATIONS

Geppert et al. Event–based Distributed Workflow Execution with EVE. IFIP International Conference on Distributed Systems Platforms and Open Distributed Processing, Sep. 1998, p. 427–42.*

Sarin et al. A Process Model and System for Supporting Collaborative Work. Conference proceedings on Organizational computing systems, 1991. ACM Doc. # 0–89791–456–2/91/0010/0213, p. 213–224.*

IBM. Managing Workflow Using Database Techniques. IBM Technical Disclosure Bulletin TDB–ACC–NO: NN9608199, Aug. 1996, v39, n8, p. 199–202.*

* cited by examiner

Primary Examiner—Tariq R. Hafiz
Assistant Examiner—Dave Robertson
(74) Attorney, Agent, or Firm—Mattingly, Stanger & Malur, P.C.

(57) ABSTRACT

A work management method and system which manage a project executed by individuals or groups belonging to an organization. In response to a phase transition request from a task management unit, a workflow management unit performs transition and activation of a business phase included in a process definition, sets a work in work management table, and issues a task addition request. In response to an event addition request or a deletion request, an event management unit adds or deletes events to or from an event queue, monitors an occurrence of the event and, when the event occurs, sends a task status transition request to the task management unit. In response to the task addition request, the task management unit sets a task name and a task status name in the work management table, generates the event associated with the task name, issues the event addition request. In response to the task status transition request described above, the task management unit sets the task status name, such as "execute" or "complete", in a task status column according to the type of the event. When the event type is "execute", the task management unit generates the event and issues the event addition request; when the event type is "complete", the unit issues a request to delete the generated event. When the task status values of all tasks, including the task that has completed, of the business phase are "complete", the task management unit issues the phase transition request.

3 Claims, 10 Drawing Sheets

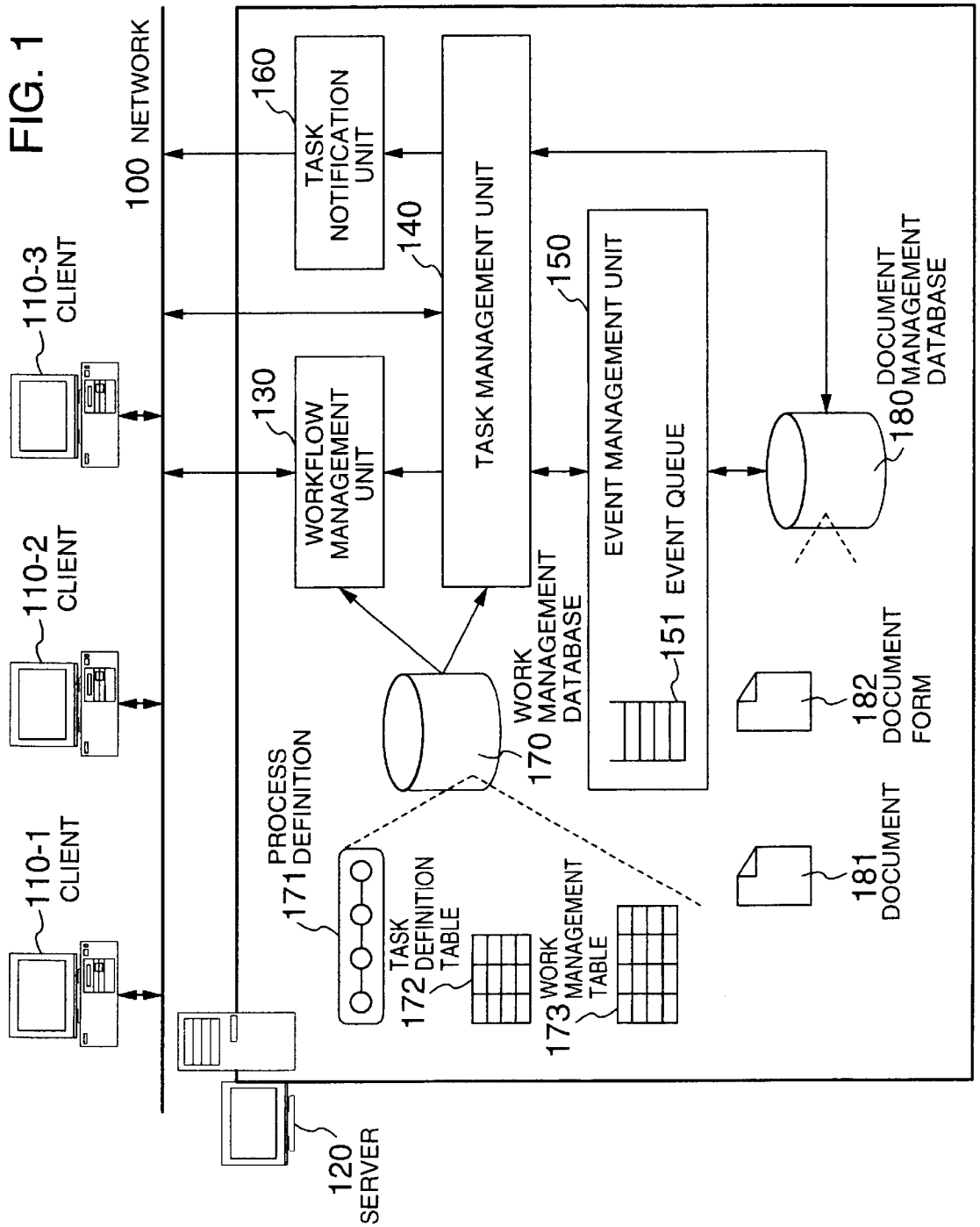

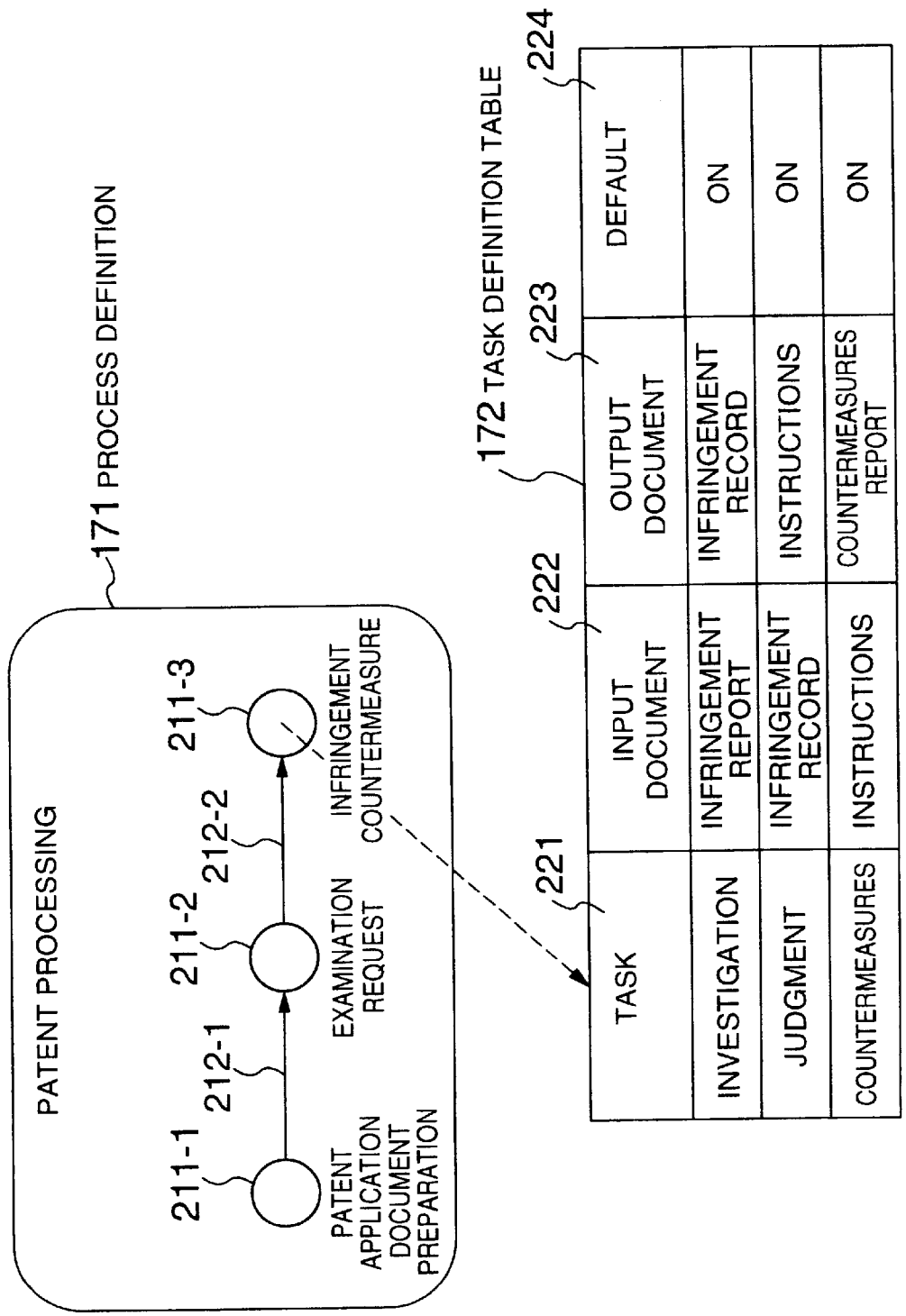

FIG. 3

173 WORK MANAGEMENT TABLE

| 310 WORK | 320 PROCESS | 330 PHASE | 340 PHASE STATUS | 350 TASK | 360 TASK STATUS |
|---|---|---|---|---|---|
| INFORMATION MANAGEMENT UNIT | PATENT PROCESSING | PATENT APPLICATION DOCUMENT PREPARATION | INACTIVE | PREPARATION | COMPLETE |
| | | | | APPROVAL | COMPLETE |
| | | EXAMINATION REQUEST | INACTIVE | REQUEST | COMPLETE |
| | | | | APPROVAL | COMPLETE |
| | | INFRINGEMENT COUNTERMEASURE | ACTIVE | INVESTIGATION | COMPLETE |
| | | | | COUNTERMEASURES | EXECUTE |
| WORKFLOW | PAPER PROCESSING | PAPER SUBSCRIPTION | ACTIVE | SUBSCRIPTION | COMPLETE |
| | | | | CORRECTION | WAIT |

FIG. 4

151 EVENT QUEUE

| WORK | DOCUMENT FORM | PROCESS | PHASE | TASK | EVENT TYPE |
|---|---|---|---|---|---|
| 410 | 420 | 430 | 440 | 450 | 460 |
| INFORMATION MANAGEMENT UNIT | COUNTERMEASURES REPORT | PATENT PROSECUTION PROCESSING | INFRINGEMENT COUNTERMEASURE | COUNTERMEASURE | COMPLETE EVENT |
| WORKFLOW | PAPER COMMENT | PAPER PROCESSING | PAPER SUBSCRIPTION | CORRECTION | START EVENT |

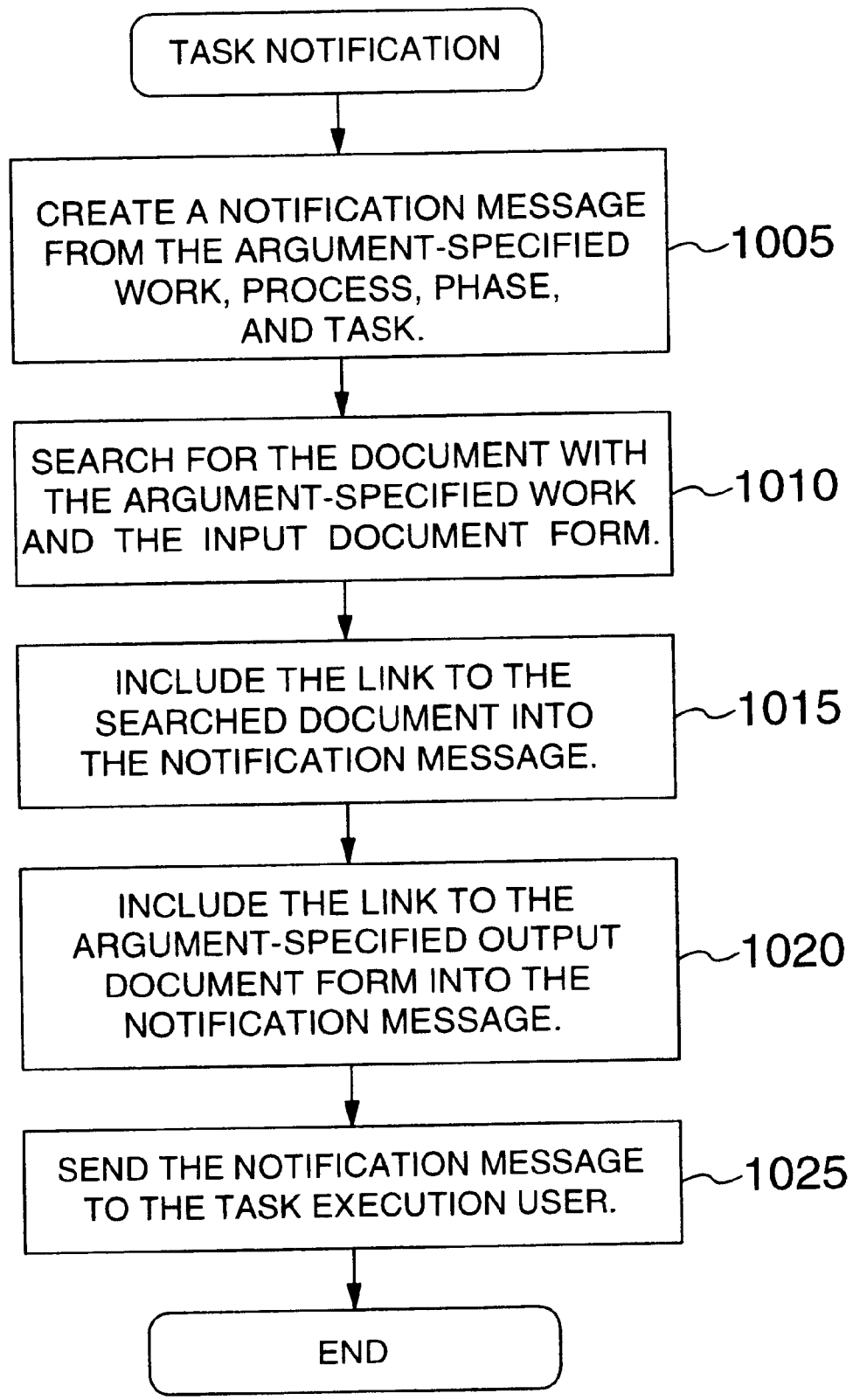

PROJECT WORK MANAGEMENT METHOD AND SYSTEM

BACKGROUND OF THE INVENTION

The present invention relates to work management technology and more particularly to a work management system suitable for managing projects performed by individuals or groups belonging to organizations.

One of technologies for managing work performed by a plurality of organization members is workflow management technology. Two types of work progress control method used by the workflow management technology are:

Data driven type: Data to be processed is made available in accordance with a process definition describing a series of work execution sequences included in the work in order to control the task progress.

Event driven type: A worker is notified of the start of a task, associated with a generated event, in accordance with a process definition describing the start condition of the task included in the work in order to control the task progress.

Some of the known configurations of workflow management systems include "Workflow System" disclosed in JP-A-07-160636 and "Workflow Support System" disclosed in JP-A-08-101817.

Also known as a prior art of changing a series of execution sequences is "Workflow Management Systems" disclosed in JP-A-08-221486.

SUMMARY OF THE INVENTION

Work to which the present invention is applied is a project to be executed by individuals or groups belonging to organizations. Work includes tasks meeting the following three conditions:

A task is included in one or more types of work executed in an organization;

A task is executed by a specific individual or by a plurality of members belonging to a specific group; and Tasks are associated with each other.

An example of work to which the present invention applies is patent processing, executed by an inventor, which includes organized work such as a patent application, request for examination, and infringement countermeasures. That is, the inventor performs the task of writing a patent specification during a patent application work, the task of deciding whether to request an examination during a consideration of examination request, and the task of checking whether or not a patent is infringed during infringement checking.

As compared with other types of work, a project executed by an individual of an organization or a project has the following features:

Tasks are generated non-continuously because each task begins when a task instruction is received, when necessary information is made available, or when a date has arrived.

Although some tasks included in work are executed in time sequence, there are some other tasks which need not be executed in time sequence and which are included or associated with the work.

The contents of a task may be changed during execution of the work.

When work to which the present invention is to be applied is managed by the conventional workflow management technology, there are problems described below.

The problems with the data driven type workflow management system are as follows:

Completion of a task triggers the next task linearly-connected in time sequence in the process definition. This makes it difficult to manage work including a plurality of tasks generated non-continuously.

Changing the contents of tasks in the process definition during execution of work makes it difficult to integrally manage the progress of the tasks of other like work.

The problems with the event driven type workflow management system are as follows:

It is difficult to monitor the progress of tasks based on the time sequence of the tasks included in a work.

It is an object of the present invention to provide a work management method and system which manage a project executed by individuals or groups belonging to an organization.

It is another object of the present invention to provide a technology that makes it easy to monitor the progress of tasks included in the event driven workflow.

It is yet another object of the present invention to provide a computer readable recording medium storing therein a program which implements the above-described method.

To achieve the above object, an aspect of the present invention provides a work management method for use in a system comprising one or more user terminals and one or more servers connected to the user terminals. The work management method for managing a process based on a process definition in which business phases, each composed of one or more tasks, are connected linearly in time sequence comprises the steps of:

in each of the servers, preparing in memory the process definition, task definition defining tasks for each business phase, and a work management table for managing work progress, and providing a workflow management unit, a task management unit, and an event management unit;

in the event management unit, providing program means for adding an event to, or deleting the event from, an event queue in response to an event addition request or an event deletion request, for monitoring a generation of the events stored in the event queue, for issuing a task status transition request to the task management unit in response to the generation of the event, and for deleting the generated event from the event queue;

in the task management unit, providing program means for storing the tasks or a task status or both in a work management table in response to a task addition request or the task status transition request, for issuing the event addition request or the event deletion request based on a task definition of the tasks and, when all the tasks of a business phase are completed, for issuing a phase transition request to the workflow management unit; and in the workflow management unit, providing program means for adding a next business phase and phase status to the work management table in response to a new work generation request or the phase transition request and based on the process definition, for obtaining a task list from the task definition corresponding to the business phase, and for issuing the task addition request to the task management unit.

A completion condition is set in a first business phase of the process definition information and, in response to whether or not the completion condition is satisfied during execution of the first business phase, the workflow management unit activates a second business phase following the first business phase.

A business phase transition condition is set in a first business phase of the process definition information and, in response to whether or not the transition condition is satisfied during execution of the first business phase, the workflow management unit activates a second business phase following the first business phase.

Other objects, features and advantages of the present invention will become apparent from the following detailed description of the embodiments taken in conjunction with the accompanying drawings.

BRIEF DESCRIPTION OF THE DRAWINGS

FIG. 1 is a block diagram showing an embodiment of a work management system for individuals or groups according to the present invention.

FIG. 2 is a conceptual diagram showing a process definition and a task definition.

FIG. 3 is a conceptual diagram showing a work management table.

FIG. 4 is a conceptual diagram showing an event queue.

FIG. 10 is a flowchart showing the task status transition processing of a task notification unit used in the embodiment of the present invention.

DESCRIPTION OF THE EMBODIMENTS

First Embodiment

Figure 5:
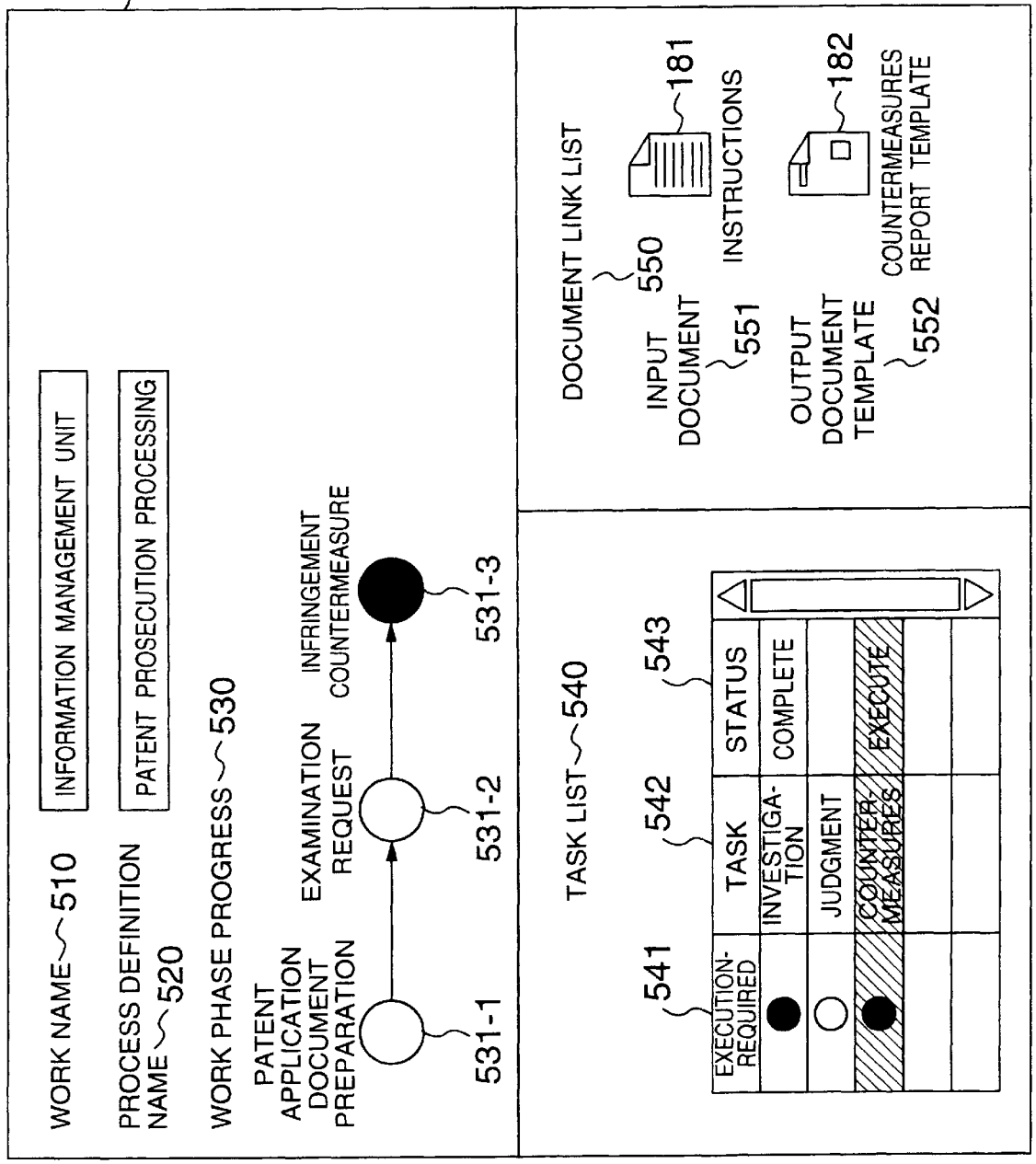
FIG. 5 is a diagram showing an embodiment of a user task screen displayed on a client according to the present invention.

The overall configuration of a work management system according to the present invention will be described below with reference to FIG. 1.

FIG. 1 shows an embodiment of a client-server type work management system.

An example of system configuration other than the above-described client-server type system is a Web type system configuration using Web browsers as user terminals. In this case, the Web browsers execute a part of work management processing using programs and data sent from the server.

The client-server type system and the Web type system differ in the location where the work management functional programs are stored and executed and in the user interface. There is no difference between them in the types and the number of functional programs.

There is also an example of the system configuration in which only user terminals are used. In this case, user terminals have the functions of the clients and the server shown in FIG. 1.

The configuration of the client-server type system will be described below.

The work management system shown in FIG. 1 has three clients 110 which act as user terminals and one server 120 which executes work management. The number of clients 110 in the work management system depends on the number of users. A plurality of servers 120 may be used in a high-load system where a concurrent processing is performed.

In the embodiment shown in FIG. 1, the server 120 has functional components including a workflow management unit 130, a task management unit 140, an event management unit 150, and a task notification unit 160. The overview of their functions will be described below.

The workflow management unit 130 manages a business phase, composed of a set of tasks, using a work management table 173 according to a process definition 171 created by the user and stored in a work management database 170.

The task management unit 140 manages a task status using the work management table 173 according to a task definition table 172 created by the user and stored in the work management database 170.

The event management unit 150 monitors an event which triggers the start and the end or completion of a task with the use of an event queue 151. In this embodiment, an event refers to the creation, editing, or deletion of documents stored in a document management database 180. It is to be understood that, in the present invention, events also include various types of events such as task start/end, Web page updating on the Internet, mail arrival, and database updating. A document 181 is created based on a document form (document template) 182.

The task notification unit 160 creates a notification message indicating the generation of a task according to the task definition table 172 and sends it to the user.

FIG. 2 shows examples of the process definition 171 and the task definition table 172.

The process definition 171 used in this embodiment is composed of business phases represented by nodes 211 connected by arcs 212 in time sequence. A business phase is defined as a conceptual business time interval used to represent the progress of work.

Although connected linearly in the process definition 171 in this embodiment, the business phases, in general, form a network including branching and branch unification.

The task definition table 172, created for each business phase for defining task start and end conditions, describes the tasks which the user may perform in that business phase.

In the process definition 171 shown in FIG. 2, three business phases of patent processing, that is, patent application document preparation, examination requesting, and infringement countermeasures, are represented as nodes 211-1, 211-2, 211-3. Arcs 212-1, 212-2 are used to represent that control is passed to the business phases in this sequence.

The task definition table 172 used in this embodiment is a table including a task column 221 identifying a task, an input document column 222 required for task execution, an output document column 223 created by task execution, and a default column 224 indicating whether or not the task is to be executed by default.

The task definition table 172 shown in FIG. 2 contains the tasks of the infringement checking business phase node 211-3. The table 172 indicates that three tasks, "investigation", "judgment", and "countermeasure", may be executed in the infringement countermeasure business phase.

The default columns 224 corresponding to the three tasks, "investigation," "judgment," and "countermeasure," in the task definition table 172 contain "ON", indicating that the three tasks will be executed by default in the business phase.

"OFF", if contained in the default column 224, indicates that the task will not be executed by default.

The user may change a set of tasks in the business phase to be executed on the clients 110. More specifically, the user may change the value in the default column 224 from ON to OFF or from OFF to ON.

FIG. 3 shows an example of the work management table 173 used to manage the work progress status. The work management table 173 is composed of a work column 310 identifying work, a process column 320 identifying a process definition to be followed in doing the work, a phase column 330 identifying a business phase representing work progress, a phase status column 340 representing the status of a business phase, a task column 350 identifying one or more tasks to be executed in the business phase, and a task status column 360 representing the status of the tasks.

The work management table 173 manages the business phase status of the work being executed, and the business phase status of some or all completed works, with the use of the phase status column 340. It also manages the status of the tasks included in each phase with the use of the task status column 360.

The phase status column 340 of the work management table 173 may take one of two values: "active" and "inactive". The workflow management unit 130 changes this value according to the process definition 171.

That is, when all tasks defined in the process definition 171 that must be executed in the current business phase are completed, the workflow management unit 130 sets the next business phase in the work management table 173 and activates the phase status column 340. When all tasks that must be executed in that business phase are completed, the workflow management unit 130 deactivates the phase status column 340 again.

The task status column 360 of the work management table 173 may take one of three values: "Wait", "Execute", and "Complete". The task management unit 140 changes this value according to the task definition table 172.

That is, when the document 181 described in the input document column 222 of the task definition table 172 is made available, the task management unit 140 changes the value of the task status column 360 of the work management table 173 from "Wait" to "Execute". When the document 181 described in the output document column 223 of the task definition table 172 is made available, the task management unit 140 changes the value of the task status column 360 of the work management table 173 from "Execute" to "Complete".

When the user on the clients 110 changes a set of tasks to be executed in a business phase, the task management unit 140 changes the set of tasks included in the work management table 173. More specifically, when the user changes value of the default column 224 of a task in the task definition table 172 from "ON" to "OFF", the task management unit 140 deletes the row composed of the task column 350 and the task status column 360 corresponding to the task in the work management table 173. Conversely, when the user changes the value of the default column 224 from "OFF" to "ON", the task management unit 140 adds a row composed of the task column 350 and the task status column 360 to the corresponding phase in the work management table 173 and then sets the task name and "wait" in the task column 350 and the task status column 360 of the row, respectively.

FIG. 4 shows an example of the event queue 151.

The event queue 151 is a queue used to manage events to be monitored.

An event refers to the creation of information required for, or created by, task execution.

In this embodiment, events are classified into the following two for management:

Start event: Refers to the addition of a document 181, required for task execution, to the document management database 180.

Complete event: Refers to the addition of a document 181, created from the document form 182 during task execution, to the document management database 180.

In this embodiment, the event queue 151 is a table composed of a work column 410 identifying the work, a document form column 420 identifying the form of the document 181 which is checked for an event, a process column 430 identifying the process definition 171 to be followed in doing the work, a phase column 440 identifying a business phase representing the work progress, a task column 450 identifying a task to be checked for an event, and an event type column 460 identifying the type of the event.

The event management unit 150 adds the start event and the complete event of a task included in an activated business phase and placed in the wait status, and monitors the occurrence of those events.

When an event occurs, the event management unit 150 notifies the task management unit 140 of the occurrence of the event and deletes the event from the event queue 151.

FIG. 5 is an example of a task screen displayed on the clients 110-1 to 110-3 when the user specifies work to be processed.

This client work screen 500 comprises a work name field 510 identifying work, a process definition name field 520 identifying the process definition 171 to be followed by the work, a business phase progress field 530 in which the progress status of the business phase is displayed, a task list field 540 in which the progress status of the tasks included in the business phase is displayed, and a document link list field 550 in which links to the documents 181 necessary for task execution are displayed.

To display the progress status of a business phase, the business phase progress field 530 of this embodiment uses the process definition 171. That is, the node 531-3 of an active business phase is displayed in back, while the node 531-1, 531-2 of an inactive business phase is displayed in white.

In the task list field 540 of this embodiment, table composed of an execution-required column 541 dentifying whether or not the task is to be executed, a ask column 542 identifying a task, and a status column 543 indicating the status of the task is displayed.

In this embodiment, the bold circle corresponding to ON in the default column 224 in FIG. 2) in the execution-required column 541 of the task list indicates that task execution is required, while the white circle (corresponding to OFF in the default column 224 in FIG. 2) indicates that task execution is not required.

The user may change the color of the circle in the execution-required column 541 of the task list field 540.

When the user changes the execution-required column 541 of the task list field 540, the default column 224 of the task definition table 172 is changed and then the work management table 173 is changed.

That is, when the user changes the execution-required column 541 to indicate that the task need not be executed, "ON" in the default column 224 is changed to "OFF", the row corresponding to the task is deleted from the work management table 173, and then the processing described below is performed.

When the business phase including the task is active, the events which will occur when the documents 181 required for, and created as a result of, task execution are added to the document management database 180 are deleted from the event queue 151 through the event management unit 150.

Similarly, when the user changes the execution-required column 541 to indicate that the task is required to be executed, "OFF" in the default column 224 is changed to "ON", the row corresponding to the task is added to the work management table 173, and then the processing described below is performed.

When the business phase including the task is active, the events which will occur when the documents 181 required for, and created as a result of, task execution are added to the document management database 180 are added to the event queue 151 through the event management unit 150.

In the document link list field 550 of this embodiment, the document links are divided into two types of link: a link to the document 181 required for task execution and a link to the document form 182 of the document 181 created as a result of task execution.

Figure 6:
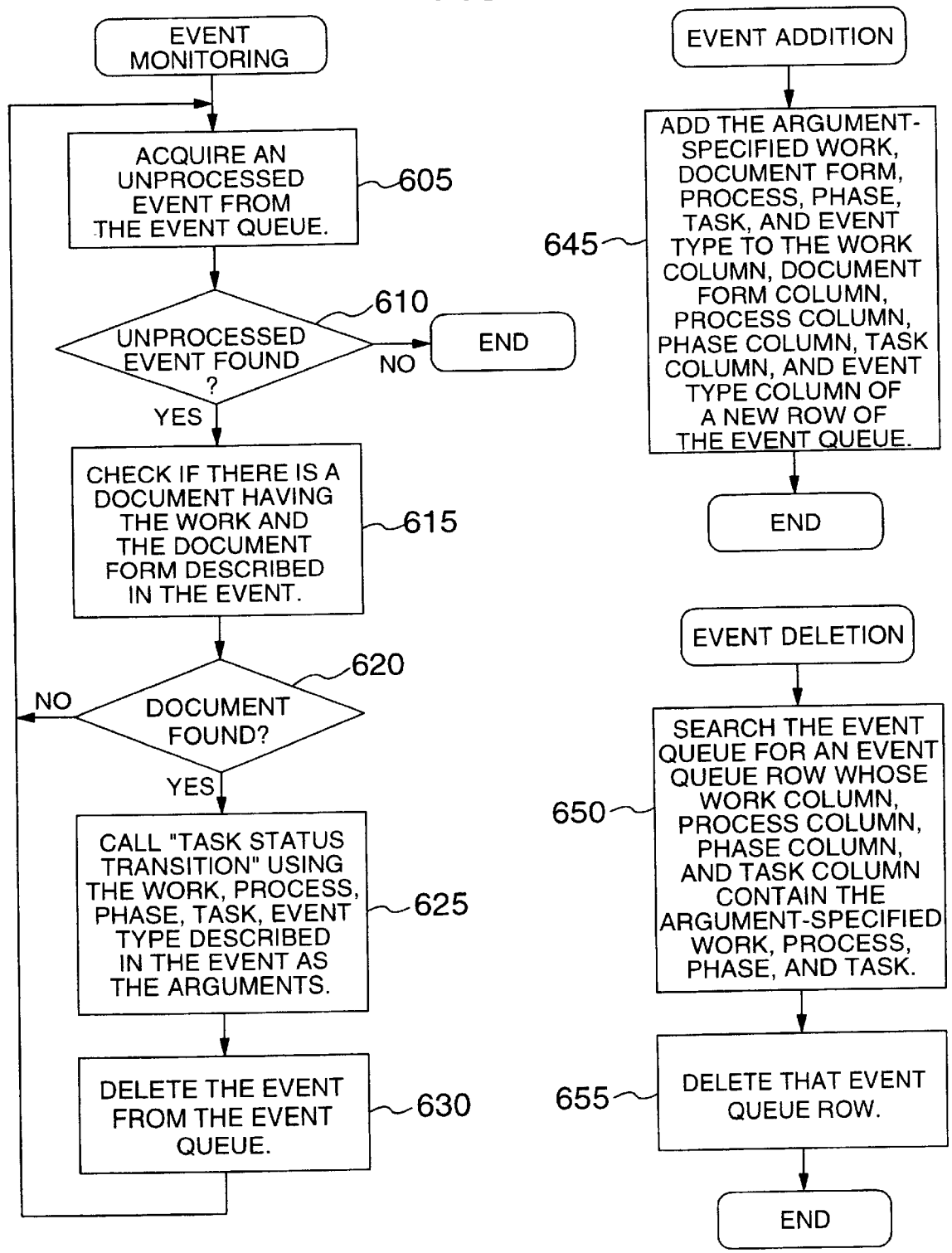
FIG. 6 are flowcharts showing the event monitoring processing, event addition processing, and event deletion processing of an event management unit used in the embodiment of the present invention.

FIG. 6 shows the flowcharts of event monitoring, event addition, and event deletion performed by the event management unit 150.

Event monitoring processing, which is a program started at a regular interval (periodically), is performed as follows:

The event management unit 150 acquires an unprocessed event from the event queue 151 (step 605).

The unit 150 checks if there is an unprocessed vent (step 610) and, if not, ends processing.

If there is an unprocessed event (step 610), the unit 150 checks the document management database 180 if there is the document 181 which is created based on the document form 182 described in the document form column 420 of the event and which describes the work described in the work column 410 of the event (step 615).

If such a document 181 is not found (step 605), control goes back to the processing (step 605).

If such a document is found (step 620), the unit 150 calls the task status transition processing (FIG. 7) of the task management unit 140, using as the arguments the work, process, phase, task, and event type described in the work column 410, process column 430, phase column 440, and task column 450.

After that, the event management unit 150 deletes the event from the event queue 151 (step 630).

Event addition processing is performed as follows:

The unit 150 adds the argument-specified work, document form, process, phase, task, and event type to the work column 410, document form column 420, process column 430, phase column 440, task column 450, and event type column 460 of a new row of the event queue 151.

Event deletion processing is performed as follows:

The unit 150 searches the event queue 151 for an event queue row whose work column 410, process column 430, phase column 440, and task column 450 contain the argument-specified work, process, phase, and task.

The unit 150 then deletes that event queue row (step 655).

Figure 7:
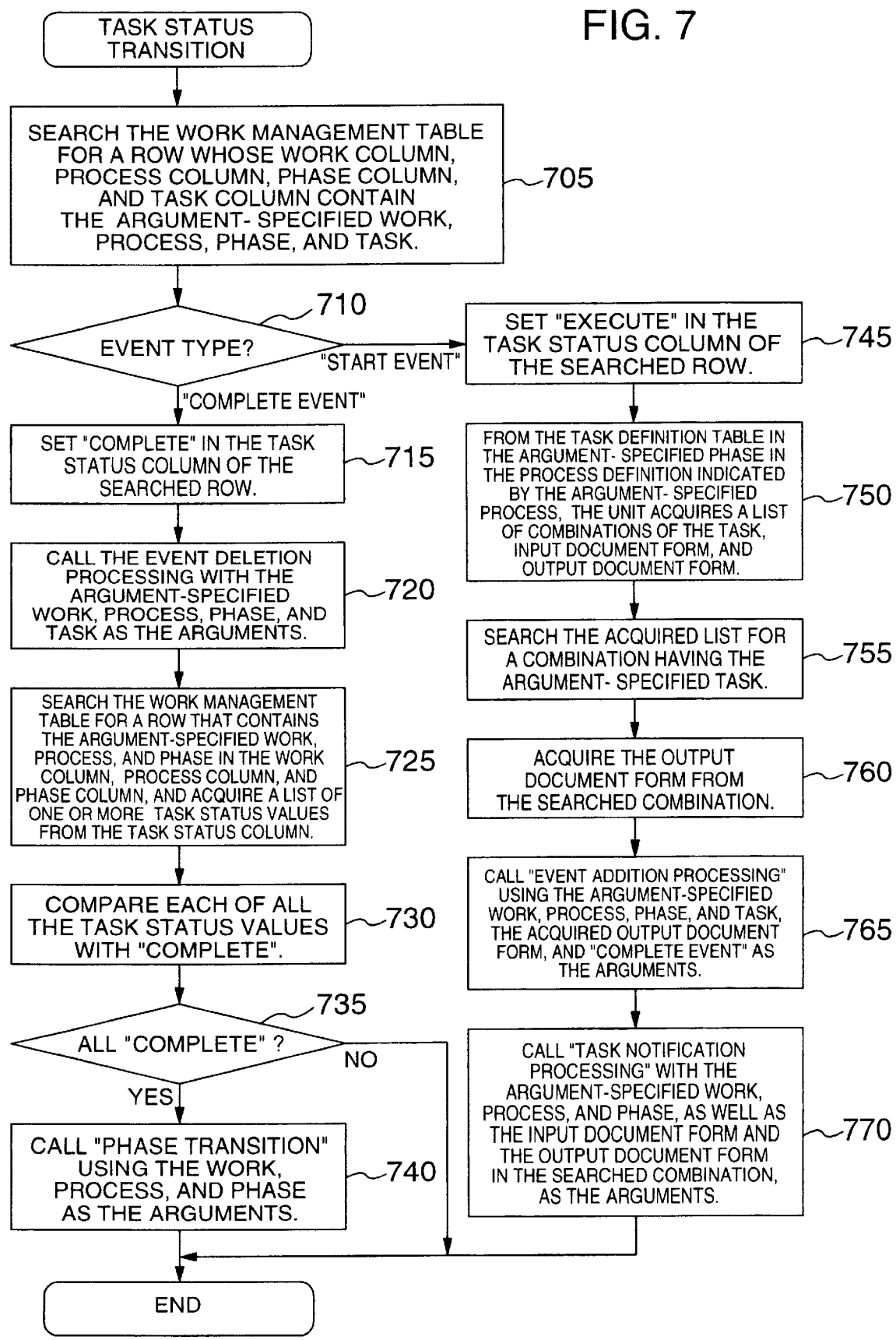
FIG. 7 is a flowchart showing the task status transition processing of a task management unit used in the embodiment of the present invention.
Figure 8:
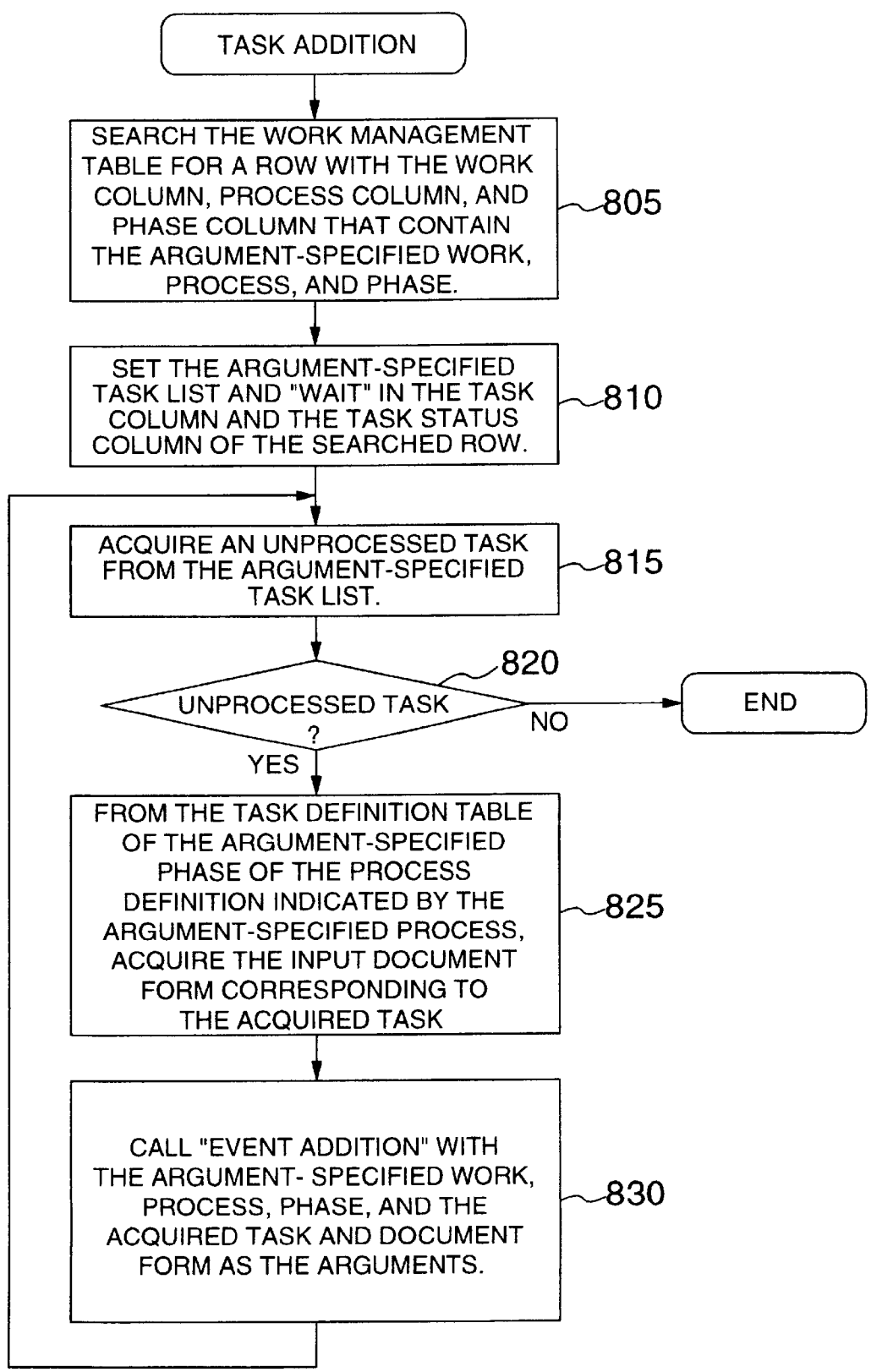
FIG. 8 is a flowchart showing the task addition processing of a task management unit used in the embodiment of the present invention.

FIGS. 7 and 8 show the processing flows of task status transition processing and task addition processing performed by the task management unit 140.

Task status transition processing is performed as follows:

The unit 140 searches the work management table 173 for a row whose work column 310, process column 320, phase column 330, and phase status column 340 contain the argument-specified work, process, phase, and task (step 705).

If the argument-specified event type is a "complete event" (step 710), control goes to processing step 715; if the event type is a "start event" (step 710), control goes to processing step 745.

The unit 140 sets "Complete" in the task status column 360 of the searched row (step 715).

The task management unit 140 calls the event deletion processing (FIG. 6) of the event management unit 150 with the argument-specified work, process, phase, and task as the arguments 720.

The task management unit 140 then searches the work management table 173 for a row that contains the argument-specified work, process, and phase in the work column 310, process column 320, and phase column 330, and acquires a list of one or more task status values from the task status column 360 (step 725).

The unit 140 compares each of all the task status values with "Complete" (step 730).

If all the task status values are "Complete" (step 735), control is transferred to processing step 740. If at least one of status values is not "Complete" (step 735), the processing ends.

In processing step 740, the unit 140 calls the phase transition processing of the workflow management unit 130 (FIG. 9) with the argument-specified work, process, and phase as the arguments (step 740).

If the event type is not "Complete", the unit 140 sets "Execute" in the task status column 360 of the searched row (step 745).

From the task definition table 172 described in the argument-specified phase in the process definition 171 indicated by the argument-specified process, the unit 140 acquires a list of combinations of the task, input document form, and output document form contained in the phase (step 750).

The unit 140 searches the obtained list for a combination having the argument-specified task (step 755).

The unit 140 acquires the output document form from the searched combination (step 760).

The unit 140 calls the event addition processing (FIG. 6) of the event management unit 150 using the argument-specified work, process, phase, and task, as well as the acquired output document and "Complete events" (the event type is always "complete" for an output document), as the arguments (step 765).

The unit 140 then calls the task notification processing (FIG. 10) with the argument-specified work, process, and phase, as well as the input document form and the output document form in the searched combination, as the arguments (step 770).

Task addition processing is performed as follows (FIG. 8):

The task management unit 140 searches the work management table 173 for a row with the work column 310, process column 320, and phase column 330 that contain the argument-specified work, process, and phase (step 805).

The unit 140 sets the argument-specified task list and "Wait" in the task column 350 and the task status column 360 of the searched row (step 810).

The unit 140 acquires an unprocessed task from the argument-specified task list (step 815).

If there is an unprocessed task (step 820), control is transferred to processing step 825. If not (step 820), control is transferred to processing step (step 820) to an end processing.

From the task definition table 172 of the argument-specified phase of the process definition 171 indicated by the argument-specified process, the unit 140 obtains the input document form corresponding to the acquired task (step 825).

The unit 140 calls the event addition processing (FIG. 6) of the event management unit 150 with the argument-specified work, process, phase, and the obtained task and document form as the arguments.

Figure 9:
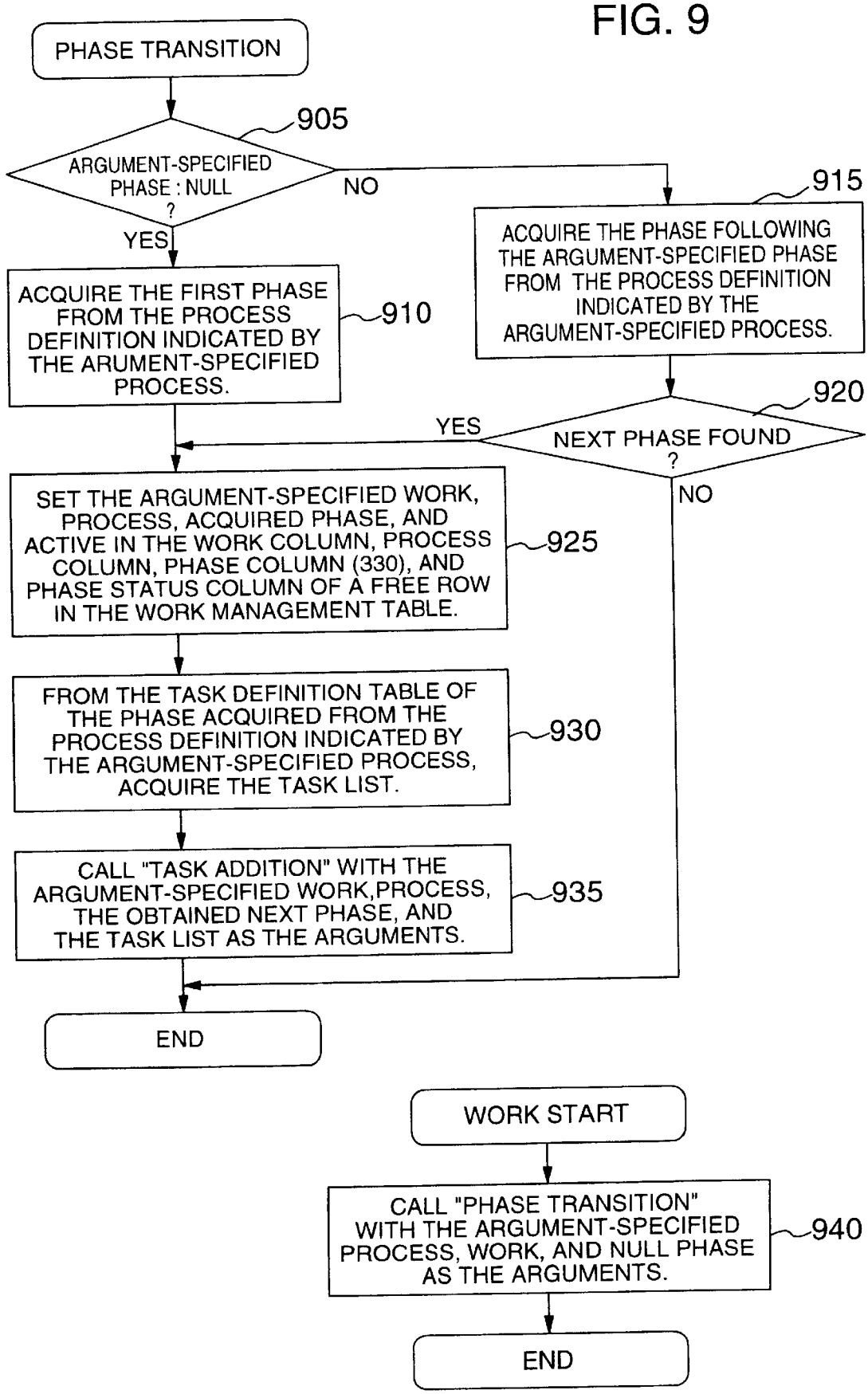
FIG. 9 is a flowchart showing the phase transition processing and the work start processing of a workflow management unit used in the embodiment of the present invention.

FIG. 9 shows the processing flow of phase transition processing and work start processing executed by the workflow management unit 130.

Phase transition processing is performed as follows:

If the argument-specified phase is NULL (step 905), control goes to processing step 910; if not NULL (step 905), control goes to processing step 915.

The unit 130 acquires 910 the first phase from the process definition 171 indicated by the argument-specified process and passes control to processing step 925.

The unit 130 acquires the phase following the argument-specified phase from the process definition 171 indicated by the argument-specified process (step 915).

If there is a phase that follows step 920, control is transferred to processing step 925; if not step 920, the processing ends.

The unit 130 sets the argument-specified work, process, acquired phase, and "Active" in the work column 310, process column 320, phase column 330, and phase status column 340 of the work management table 173 (step 925) and activates the business phase.

From the task definition table 172 of the phase obtained from the process definition 171 indicated by the argument-specified process, the unit 130 acquires the task list (step 930).

The unit 130 calls the task addition processing (FIG. 8) of the task management unit 140 with the argument-specified work, process, the obtained next phase, and the task list as the arguments (step 935).

Work start processing is performed as follows:

The phase transition processing of the workflow management unit 130 is called with the argument-specified work, process, and NULL phase as the arguments (step 940).

FIG. 10 shows the processing flow of task notification performed by the task notification unit 160.

The task notification unit 160 creates a notification message from the argument-specified work, process, phase, and task (step 1005).

The unit 160 searches the document management database 180 for the document 181 with the argument-specified work and the input document form (step 1010).

The unit 160 includes the link to the searched document 181 into the notification message (step 1015).

The unit 160 includes the link to the argument-specified output document form 182 into the notification message (step 1020).

The unit 160 sends the notification message to the task execution user (step 1025).

Second Embodiment

In the first embodiment, when all the tasks of a phase in the work management table 173 are completed, the phase is deactivated and the next phase is activated.

However, two or more tasks of different business phases may be executed concurrently in actual work management. For example, a task in business phase A may overlap in time with a task in business phase B.

To solve this, one of the following two methods may be used:

A rule is added to a business phase to control the end of the business phase flexibly.

A rule is added to a business phase to control the start of the business phase flexibly.

To implement the former rule, the deadline attribute may be added to the node 211 in the process definition 171.

By passing the deadline attribute added to the node 211 in the process definition 171 to the work management table 173, the workflow management unit 130 may check the deadline of the business phase periodically. When the deadline comes, the unit 130 may activate the next business phase assuming that the current business phase has ended.

To implement the latter rule, the task-completion-required column may be added to the task definition table 172 to specify whether the completion of the task is required for the business phase including that task.

By passing the value of the task-completion-required column of the task definition table 172 to the work management table 173, the task management unit 140 may activate the business phase following the one including that task when all the tasks with the required attribute are completed during the task status transition processing.

The present invention allows the business phase status and the task progress status to be managed integrally, thus making it possible for individuals or groups belonging to an organization to manage projects.

What is claimed is:

1. A method for implementing a business process composed of a plurality of business phases using a computer, comprising:

holding process definition information defining an execution sequence of said plurality of business processes, and holding task definition information that is changeable by a user of each business phase in a task definition table defining a possible task which may be executed in a relevant business phase and whether to execute said task and which task in the task definition table is to be executed, for each of said plurality of business phases, monitoring an execution state of a task being executed in an activated business phase; and activating a business phase to be executed next to an activated business phase based on the execution state of a task obtained by said monitoring and said held task definition information even when all tasks in a task set for the activated business phase have not been completed for execution.

2. A method of implementing a business process according to claim 1, wherein said monitoring step monitors whether the task has been completed or not; and said activating step performs said activating in response to completion of a predetermined task defined by said task definition information.

3. A method of implementing a business process according to claim 2, wherein said monitoring step judges that a relevant task has been executed when electronic data created by said predetermined task has been stored in a predetermined memory.

* * * * *